(12) United States Patent
Karasudani et al.

(10) Patent No.: US 7,958,121 B2
(45) Date of Patent: Jun. 7, 2011

(54) INFORMATION RETRIEVAL APPARATUS AND INFORMATION RETRIEVAL METHOD

(75) Inventors: Akira Karasudani, Kawasaki (JP); Takahiro Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 698 days.

(21) Appl. No.: 11/847,100

(22) Filed: Aug. 29, 2007

(65) Prior Publication Data

US 2008/0114754 A1    May 15, 2008

(30) Foreign Application Priority Data

Nov. 10, 2006 (JP) .................... 2006-305711

(51) Int. Cl.
  *G06F 17/30* (2006.01)
(52) U.S. Cl. .................................... 707/736
(58) Field of Classification Search ............ 707/999.005
  See application file for complete search history.

(56) References Cited

U.S. PATENT DOCUMENTS

| | | | |
|---|---|---|---|
| 2006/0195441 A1* | 8/2006 | Julia et al. | 707/5 |
| 2006/0248091 A1* | 11/2006 | Yamamoto et al. | 707/100 |
| 2007/0169148 A1* | 7/2007 | Oddo et al. | 725/46 |
| 2008/0104127 A1* | 5/2008 | Billmaier et al. | 707/200 |

FOREIGN PATENT DOCUMENTS

JP    2004-194107    7/2004

OTHER PUBLICATIONS

Takenobu Tokunaga: "Jouhou Kensaki to Gengo Syori" "Information Retrieval and Language Processing", University of Tokyo Press (1999).

Amit Singhal, Chris Buckley, Mandar Mitra, "Pivoted Document Length Normalization" Department of Computer Science, Cornell University, Ithica, NY 14853.

Takenobu Tokunaga: "Jouhou Kensaku to Gengo Syori" "Information Retrieval and Language Processing", University of Tokyo Press (1999).

Korean Office Action issued on Mar. 17, 2009 in corresponding Korean Patent Application 10-2007-0096088.

* cited by examiner

*Primary Examiner* — Neveen Abel-Jalil
*Assistant Examiner* — Kevin Young
(74) *Attorney, Agent, or Firm* — Fujitsu Patent Center

(57) ABSTRACT

A retrieval information that is a retrieval target, acquired from an information source, is arranged on a vector space. Data of a usage information and a content specifying manners of usage, used by the user in the past is acquired by a usage-information acquisition unit. A user's preference extraction unit extracts a preference of a user from the data, and notifies a number-of-effective-elements reduction unit of the extracted data. The number-of-effective-elements reduction unit evaluates each element of a vector of retrieval information by using the preference of the user, and reduces the number of effective elements by removing the elements smaller than a certain criteria. Thereafter, a statistic is acquired in the vector space of the vector of the retrieval information, and the cosine normalization is performed on the result that includes a large number of elements, and the normalization in which the variation of the statistic was compensated by the average weight is performed on the result that includes a small number of elements.

15 Claims, 9 Drawing Sheets

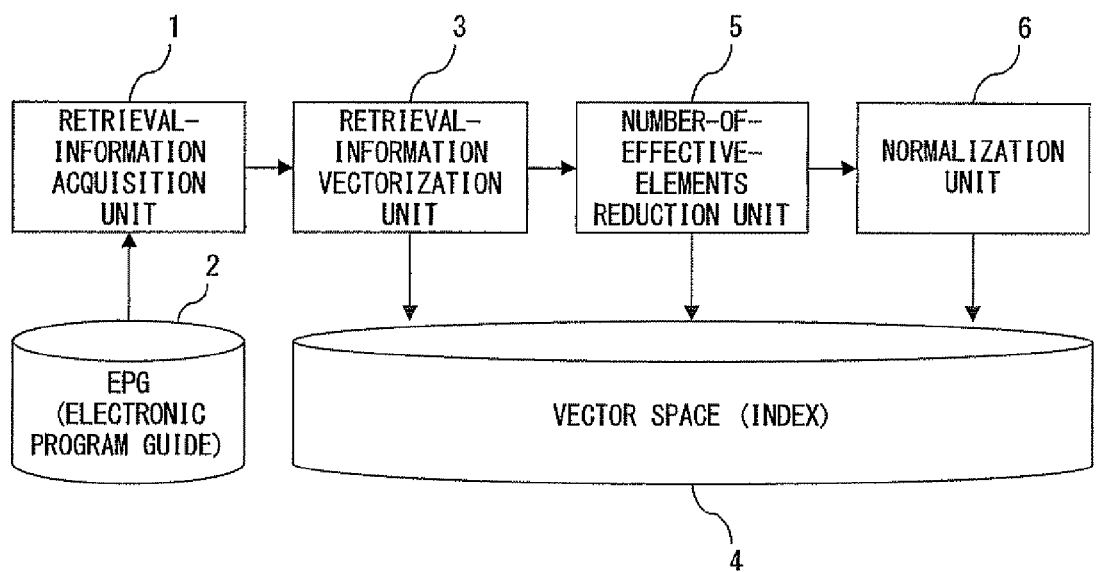
F I G. 1

| INFORMATION ID | PROGRAM NAME | PROGRAM CONTENTS | CATEGORY |
|---|---|---|---|
| 001 | JUNJOU KIRARI | MIYAZAKI AOI… | DRAMA |
| 002 | FIFA WORLD CUP 2006 | FINAL MATCH: ITALY VERSUS FRANCE… | SPORTS |
| 003 | HIGH SCHOOL BASEBALL TOURNAMENT | KANAGAWA PREFECTURE, THIRD ROUND, FIRST GAME… | SPORTS |
| 004 | FIFA WORLD CUP 2006 | SEMI-FINAL… | SPORTS |
| … | … | … | … |

F I G. 4 A

| USAGE HISTORY ID | TIME AND DATE OF USAGE | INFORMATION ID OF USAGE TARGET | MANNER OF USAGE |
|---|---|---|---|
| 001 | 2006/9/28 15:00 | 001 | RECORDING |
| 002 | 2006/9/18 12:00 | 002 | PLAYING |
| 003 | 2006/9/25 20:00 | 002 | PLAYING |
| 004 | 2006/9/25 22:00 | 004 | PLAYING |
| 005 | 2006/9/25 26:00 | 003 | PLAYING |
| … | … | … | … |

F I G. 4 B

| INFORMATION ID | DEGREE OF IMPORTANCE |
|---|---|
| 001 | 2 |
| 002 | 4 |
| 003 | 2 |
| … | … |

F I G. 4 C

| INFORMATION ID | INFORMATION USED FOR RETRIEVAL (RETRIEVAL KEY, KEYWORD) | WEIGHT |
|---|---|---|
| 001 | JUNJOU, KIRARI, MIYAZAKI, AOI, DRAMA… | 2 |
| 002 | FIFA, WORLD CUP, 2006, FINAL, ITALY, FRANCE, SPORTS… | 4 |
| 003 | HIGH SCHOOL, BASEBALL, KANAGAWA PREFECTURE, THIRD ROUND, FIRST GAME, SPORTS… | 2 |
| 004 | FIFA, WORLD CUP, 2006, SEMI-FINAL, SPORTS… | 2 |
| … | … | … |

F I G. 4 D

| INFORMATION USED FOR RETRIEVAL | WEIGHT |
|---|---|
| SPORTS | 8 |
| FIFA | 6 |
| WORLD CUP | 6 |
| 2006 | 6 |
| FINAL | 4 |
| ITALY | 4 |
| FRANCE | 4 |
| SEMI-FINAL | 4 |
| … | … |

F I G. 4 E

| INFORMATION ID | ELEMENT 1 | ELEMENT 2 | ... | ELEMENT 21 | ELEMENT 22 | ... |
|---|---|---|---|---|---|---|
| 001 | JUNJOU 2.4 | KIRARI 2.6 | ... | MIYAZAKI 1.5 | NHK 1.2 | ... |
| 002 | SPORTS 4.5 | WORLD CUP 2.5 | ... | ITALY 0.5 | FRANCE 0.5 | ... |
| 003 | HIGH SCHOOL 3.5 | BASEBALL 2.5 | ... | THIRD ROUND 2.0 | KANAGAWA 1.2 | ... |
| ... | ... | ... | ... | ... | ... | ... |

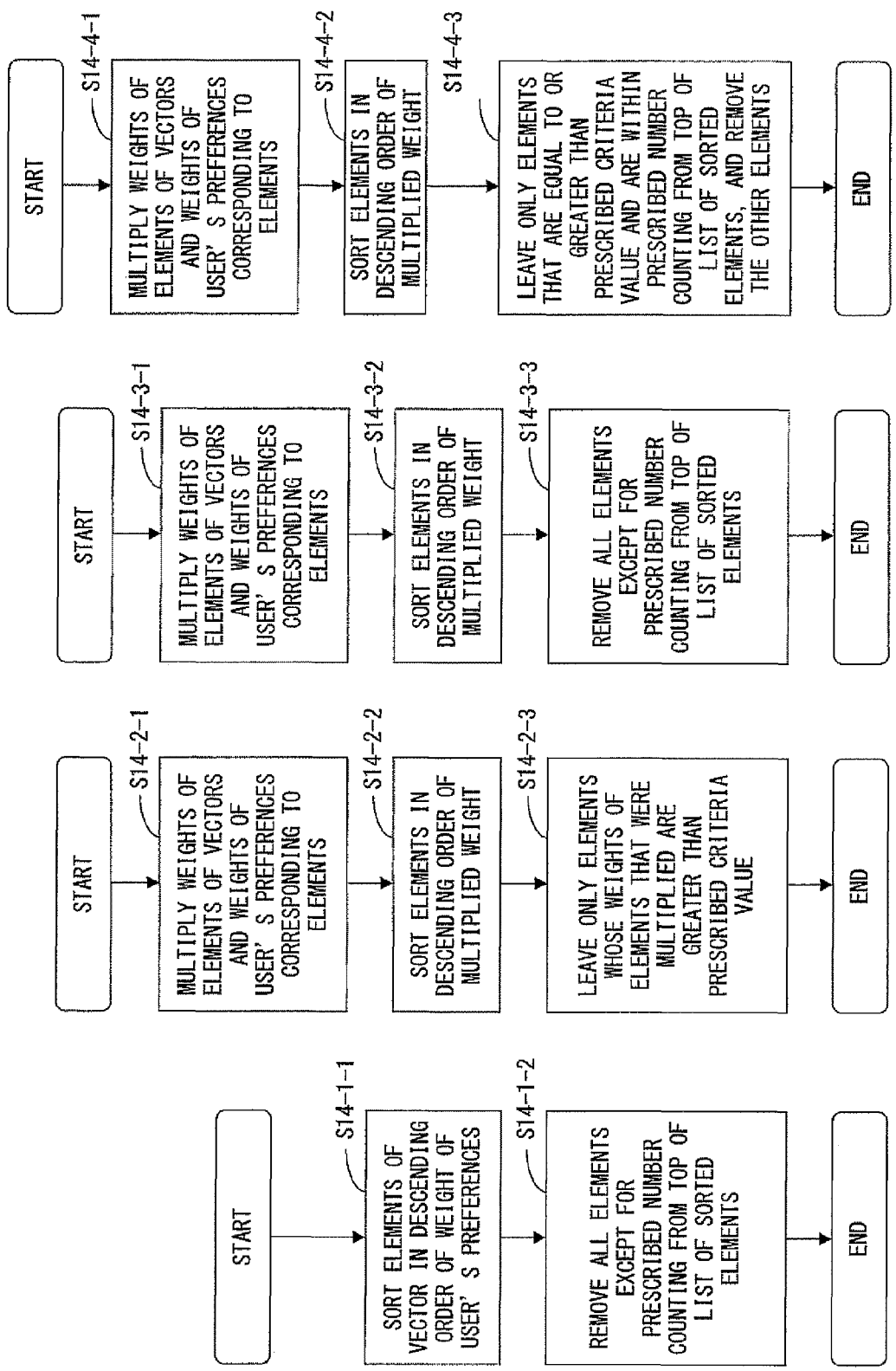

FIG. 7A

| INFORMATION ID | ELEMENT 1 | ELEMENT 2 | ... | ELEMENT 21 | ELEMENT 22 | ... |
|---|---|---|---|---|---|---|
| 001 | JUNJOU 2.4 | KIRARI 2.6 | ... | MIYAZAKI 1.5 | NHK 1.2 | ... |
| 002 | SPORTS 4.5 | WORLD CUP 2.5 | ... | ITALY 0.5 | FRANCE 0.5 | ... |
| 003 | HIGH SCHOOL 3.5 | BASEBALL 2.5 | ... | THIRD ROUND 2.0 | KANAGAWA 1.2 | ... |
| ... | ... | ... | ... | ... | ... | ... |

FIG. 7B

| INFORMATION ID | ELEMENT 1 | ELEMENT 2 | ... | ELEMENT 21 | ELEMENT 22 | ... |
|---|---|---|---|---|---|---|
| 001 | KIRARI 5.2 | JUNJOU 4.8 | ... | MIYAZAKI 3.0 | NHK 2.4 | ... |
| 002 | SPORTS 36.0 | WORLD CUP 15.0 | ... | ITALY 2.0 | FRANCE 2.0 | ... |
| 003 | HIGH SCHOOL 7.0 | BASEBALL 5.0 | ... | THIRD ROUND 4.0 | KANAGAWA 2.4 | ... |
| ... | ... | ... | ... | ... | ... | ... |

FIG. 7C

| INFORMATION ID | ELEMENT 1 | ELEMENT 2 | ... | ELEMENT 21 | ELEMENT 22 | ... |
|---|---|---|---|---|---|---|
| 001 | KIRARI 5.2 | JUNJOU 4.8 | ... | MIYAZAKI 3.0 | NHK 2.4 | ... |
| 002 | SPORTS 36.0 | WORLD CUP 15.0 | ... | ITALY 2.0 | FRANCE 2.0 | ... |
| 003 | HIGH SCHOOL 7.0 | BASEBALL 5.0 | ... | THIRD ROUND 4.0 | KANAGAWA 2.4 | ... |
| ... | ... | ... | ... | ... | ... | ... |

FIG. 7D

| INFORMATION ID | ELEMENT 1 | ELEMENT 2 | ... | ELEMENT 21 | ELEMENT 22 | ... |
|---|---|---|---|---|---|---|
| 001 | KIRARI 5.2 | JUNJOU 4.8 | ... | MIYAZAKI 3.0 | NHK 2.4 | ... |
| 002 | SPORTS 36.0 | WORLD CUP 15.0 | ... | ITALY 2.0 | FRANCE 2.0 | ... |
| 003 | HIGH SCHOOL 7.0 | BASEBALL 5.0 | ... | THIRD ROUND 4.0 | KANAGAWA 2.4 | ... |
| ... | ... | ... | ... | ... | ... | ... |

FIG. 7E

| INFORMATION ID | ELEMENT 1 | ELEMENT 2 | ... | ELEMENT 21 | ELEMENT 22 | ... |
|---|---|---|---|---|---|---|
| 001 | KIRARI 5.2 | JUNJOU 4.8 | ... | MIYAZAKI 3.0 | NHK 2.4 | ... |
| 002 | SPORTS 36.0 | WORLD CUP 15.0 | ... | ITALY 2.0 | FRANCE 2.0 | ... |
| 003 | HIGH SCHOOL 7.0 | BASEBALL 5.0 | ... | THIRD ROUND 4.0 | KANAGAWA 2.4 | ... |
| ... | ... | ... | ... | ... | ... | ... |

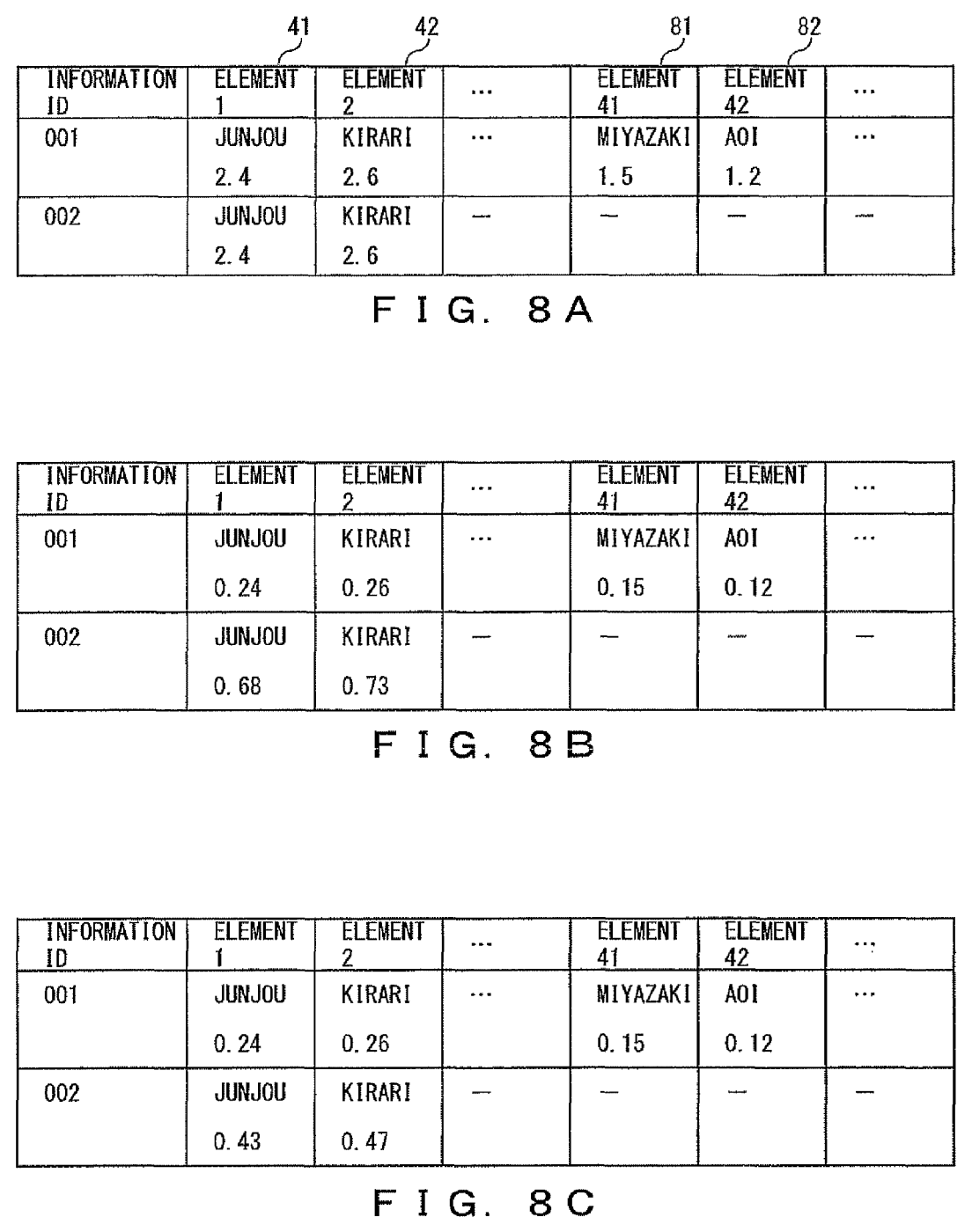

| INFORMATION ID | ELEMENT 1 | ELEMENT 2 | ... | ELEMENT 41 | ELEMENT 42 | ... |
|---|---|---|---|---|---|---|
| 001 | JUNJOU 2.4 | KIRARI 2.6 | ... | MIYAZAKI 1.5 | AOI 1.2 | ... |
| 002 | JUNJOU 2.4 | KIRARI 2.6 | — | — | — | — |

F I G. 8 A

| INFORMATION ID | ELEMENT 1 | ELEMENT 2 | ... | ELEMENT 41 | ELEMENT 42 | ... |
|---|---|---|---|---|---|---|
| 001 | JUNJOU 0.24 | KIRARI 0.26 | ... | MIYAZAKI 0.15 | AOI 0.12 | ... |
| 002 | JUNJOU 0.68 | KIRARI 0.73 | — | — | — | — |

F I G. 8 B

| INFORMATION ID | ELEMENT 1 | ELEMENT 2 | ... | ELEMENT 41 | ELEMENT 42 | ... |
|---|---|---|---|---|---|---|
| 001 | JUNJOU 0.24 | KIRARI 0.26 | ... | MIYAZAKI 0.15 | AOI 0.12 | ... |
| 002 | JUNJOU 0.43 | KIRARI 0.47 | — | — | — | — |

F I G. 8 C

INFORMATION RETRIEVAL APPARATUS AND INFORMATION RETRIEVAL METHOD

BACKGROUND OF THE INVENTION

1. Field of the Invention

The present invention relates to an information retrieval apparatus and an information retrieval method that enables more accurate and speedier retrieval of information that matches users' preferences.

2. Description of the Related Art

Information devices with functions that retrieve broadcast programs that match the preferences of users such that the users can easily view or record the programs have been conventionally suggested in the form of personal computers (PC) allowing viewing of television programs and video images and in the form of personal video recorders (PVR: a recording device having a HDD or a DVD drive).

The functions of these types of information devices are realized in a manner in which the information device searches an electronic program guide (EPG) in order to retrieve programs that a user favors by using as a retrieval key the preferences of the user. The information device suggests the retrieved programs as recommendations to the user, or records the retrieved programs automatically.

The above user preferences are extracted by the information device through an analysis of the behavior of the user. For example, information that is common among the programs that a user often views or records is extracted, and the extracted information is used as a retrieval key that corresponds to the user's preferences.

As techniques for retrieving broadcast programs by using retrieval keys, the Boolean method and the vector space method are suggested.

The Boolean method is a method of retrieving information in which information including a retrieval key is handled as "True", and information not including a retrieval key is handled as "False".

The vector space method is a method in which target information and a retrieval condition consisting of at least one retrieval key are arranged over a vector space, and retrieval is performed by using the degrees of similarity between their vectors. The respective axes on the vector space correspond to the retrieval keys (retrieval key information) such as respective key words, date and time, and the like. In other words, the respective elements in a vector correspond to the retrieval keys included in the retrieval target, and the element values (weights) correspond to the frequencies with which the retrieval keys are included in information. It is generally thought that the vector space method allows for highly accurate retrieval.

However, in the vector space method, "n×m" number of retrieval processes are required, where the number of pieces of information functioning as the retrieval targets is n and the number of retrieval keys included in each piece of information is m; this causes the retrieval time to increase geometrically with the information amount, which is problematic. Accordingly, in the vector space method, the number of retrieval keys included in the retrieval target information has to be reduced before the retrieval process.

As a method of reducing the amount of retrieval key information, a method in which retrieval key information having small element values in a vector is removed, cluster analysis, and principal component analysis can be employed.

A method in which retrieval key information having small element values is removed is a method in which the retrieval key information that is to be removed is determined, when creating a retrieval index, on the basis of the element value. However, when the retrieval key that has been removed is one of the keys included in the retrieval condition, the retrieval using that retrieval key cannot be performed in such a manner that the retrieval accuracy decreases, which is problematic.

Cluster analysis and principal component analysis are similar to each other, and each is a method in which a plurality of pieces of retrieval key information that are all included in one piece of information and that are similar to each other in meaning and concept are put together into one piece of information. For example, when there are terms (retrieval key information) such as "news", "press", and the like that are similar to each other, these term are put together into one piece retrieval key information (for example, "press"). However, the cluster analysis and principal component analysis have a problem in that immense processing time is required for the calculation of putting similar terms together into one.

Also, the vector space method has an additional drawback to the above drawbacks that the cluster analysis and principal component analysis have: in the vector space method, the statistical characteristic of the amount of retrieval key information included in the retrieval target information affects the retrieval accuracy.

Generally, the amounts of retrieval key information in retrieval target information differ from each other, and information including a large amount of retrieval key information and information including a small amount of retrieval key information are included in the same group. In the vector space method, the larger the amount of retrieval key information included in retrieval targets, the more the retrieval targets tend to be ranked highly in the list of retrieval results, and the smaller the amount of retrieval key information included in retrieval targets, the more rarely the retrieval targets are retrieved.

However, a retrieval target that includes much retrieval key information is not always important information obtained as a retrieval result. When a user tries to retrieve information, it is only the information that the user wants that is "important information", and the retrieval target including a large amount of retrieval key information in the vector space is not always information that is important to the user.

Actually, respective pieces of information on EPGs contain different amounts of information, and some programs have large amounts of information consisting of program names or detailed contents of the programs, while other programs have small amounts of information consisting only of program names. When a search is performed on a group including these programs, the programs having large amounts of information are ranked highly in the list of the retrieval result, and the programs having small amounts of information are not retrieved.

However, even programs that only include the programs' names and do not include the contents of the programs such that they do not have large amounts of information as described above can be programs that the user wants to be retrieved as the retrieval result. This is a factor in decreasing the retrieval accuracy.

In order to solve this problem, some methods have been suggested such as cosine normalization in which variations in information are leveled by normalizing vectors (as is seen in, for example, "Information retrieval and language processing" (Patent Document 1) written by Kensin Tokunaga and published in 1999 by University of Tokyo Press) and pivoted normalization (as is seen in, for example, "Pivoted Document Length Normalization" (Patent Document 2) written by Amit Singhal, Chris Buckley, and Mandar Mitra, SIGIR 1996).

FIG. 1 is a block diagram showing a system for creating retrieval indexes for the above-described conventional techniques. As shown in FIG. 1, a retrieval-information acquisition unit 1 acquires, from an EPG 2 that is the information source, retrieval information that is the retrieval target.

Next, a retrieval-information vectorization unit 3 arranges the above-acquired retrieval information on a vector space 4 formed on an area in a memory unit, and vectorizes the retrieval information.

Then, a number-of-effective-elements reduction unit 5 determines retrieval keys to be removed by using the element value (weight as the retrieval key) of the retrieval information vectorized on the vector space 4. Thereafter, the number-of-effective-elements reduction unit 5 reduces the number of effective elements included in the retrieval information.

A normalization unit 6 normalizes, by using the cosine normalization or the pivoted normalization, the vector of the retrieval information whose number of effective elements has been adjusted. Thereby, the retrieval information is arranged on the vector space 4 as a normalized vector, and the retrieval index is obtained.

A function of retrieving broadcast programs that match users' preferences has to fulfill at least the three requirements described below.

The first requirement is that the function has to be a function that retrieves programs matching user's preferences highly accurately. High accuracy used herein is a high probability that the retrieval result includes the information that the user wants; in other words, a high relevance factor with respect to the user's preferences.

The second requirement is that the function has to speedily retrieve programs that users want from among the programs that are about to begin being broadcast. This function is carried out by understanding the current preferences of the user.

The third requirement is that the function has to be a function that does not burden users to retrieve programs. In order to avoid burdening users, the function has to be a function that can automatically retrieve programs without requiring users to perform preparations (such as the creation of indexes) for retrieval or to perform the setting of retrieval conditions.

However, as described above, there is a problem in which, when a system that retrieves information on the vector space employs a conventional method for reducing the amounts of retrieval key information included in the retrieval target, the retrieval accuracy decreases and immense processing time is required for the calculation.

Also, the above cosine normalization has a characteristic in which the smaller the amount of retrieval key information included in the information, the larger the weight (element value) of the retrieval key information becomes via the normalization. Accordingly, the smaller the amount of retrieval key information included in the information, the more that information tends to be ranked highly in the list of retrieval results regardless of whether or not that information is important for the user. This is also a factor causing a decrease in the retrieval accuracy.

Pivoted normalization allows an appropriate leveling; however, it requires users to perform preliminary evaluation tests in order to adjust the parameters of slope and pivot from the set of parameters including slope, pivot, and old-normalization. This greatly burdens users, and is problematic.

On the basis of the above discussions, it is concluded that none of the conventional techniques disclosed in Patent Documents 1 and 2 fulfill the above three requirements.

SUMMARY OF THE INVENTION

In view of the above problems, it is an object of the present invention to provide an information retrieval apparatus and an information retrieval method that enable more accurate and speedier retrieval of information that matches users' preferences.

In order to achieve the above object, an information retrieval apparatus according to the present invention is an information retrieval apparatus by which a user retrieves information, comprising:

usage-information acquisition unit acquiring a set of pieces of usage information that is information used by the user in the past and also acquiring manners in which the respective pieces of usage information are used; and user's preference tendency extraction unit extracting a preference of the user from the set of pieces of usage information and from the manners of usage acquired by the usage-information acquisition unit;

retrieval-information acquisition unit acquiring retrieval information of the type retrieval target information from an information source; retrieval-information vectorization unit arranging as a vector, on a vector space, the retrieval information acquired by the retrieval-information acquisition unit; and number-of-effective-retrieval-keys reduction unit reducing the number of vectors that are effective as retrieval keys from among the vectors of the retrieval information arranged by the retrieval-information vectorization unit on the vector space, wherein:

the user's preference tendency extraction unit extracts a preference tendency of the user by:
  obtaining a degree of importance that is the degree to which the user places importance on the usage information on the basis of the manners of usage of the respective pieces of usage information;
  assigning weights to retrieval keys included in the usage information on the basis of the obtained degree of importance; and
  obtaining a sum of the weights of retrieval keys common among the respective pieces of usage information in the set of pieces of usage information; and the number-of-effective-retrieval-keys reduction unit reduces the number of effective retrieval keys of the vectors of the retrieval information by:
  evaluating the retrieval keys of the vectors of the retrieval information by using the preferences of the user obtained by the user's preference tendency extraction unit; and
  removing the retrieval keys not satisfying an evaluation criterion.

Also, an information retrieval apparatus according to the present invention is an information retrieval apparatus by which a user retrieves information, comprising:

retrieval-information acquisition unit acquiring from an information source retrieval information that is retrieval target information;

retrieval-information vectorization unit arranging, on a vector space, the retrieval information acquired by the retrieval-information acquisition unit;

statistic acquisition unit acquiring a statistic of a vector of the retrieval information arranged by the retrieval-information vectorization unit on a vector space; and normalization unit normalizing the vector of the retrieval information acquired as the statistic by the statistic acquisition unit, wherein:

the normalization unit normalizes the vector of the retrieval information by using the statistic acquired by the statistic acquisition unit.

Also, an information retrieval apparatus according to the present invention is an information retrieval method using a computer, comprising:

a usage-information acquisition step of acquiring a set of pieces of usage information that is information used by a user in the past and manners of usage of the respective pieces of usage information; and a user's preference tendency extraction step of extracting a preference of the user from the set of pieces of usage information and the manners of usage acquired in the usage-information acquisition step;

a retrieval-information acquisition step of acquiring from an information source retrieval information that is retrieval target information;

a retrieval-information vectorization step of arranging as a vector, on a vector space, the retrieval information acquired in the retrieval-information acquisition step; and a number-of-effective-retrieval-keys reduction step of reducing the number of vectors that are effective as retrieval keys from among the vectors of the retrieval information arranged on the vector space in the retrieval-information vectorization step, wherein:

a preference tendency of the user is extracted in the user's preference tendency extraction step by:

obtaining a degree of importance that is a degree at which the user puts importance on the usage information on the basis of the manners of usage of the respective pieces of usage information;

assigning weights to retrieval keys included in the usage information on the basis of the obtained degree of importance; and obtaining a sum of the weights of retrieval keys common among the respective pieces of usage information in the set of pieces of usage information; and the number of effective retrieval keys of the vectors of the retrieval information is reduced in the number-of-effective-retrieval-keys reduction step by:

evaluating the retrieval keys of the vectors of the retrieval information by using the preferences of the user obtained by the user's preference tendency extraction unit; and removing the retrieval keys not satisfying an evaluation criterion.

Also, an information retrieval method according to the present invention is an information retrieval method using a computer, comprising:

a retrieval-information acquisition step of acquiring from an information source retrieval information that is retrieval target information;

a retrieval-information vectorization step of arranging, on a vector space, the retrieval information acquired in the retrieval-information acquisition step;

a statistic acquisition step of acquiring a statistic of a vector of the retrieval information arranged on a vector space in the retrieval-information vectorization step; and a normalization step of normalizing the vector of the retrieval information acquired as the statistic in the statistic acquisition step, wherein:

in the normalization step, the vector of the retrieval information is normalized by using the statistic acquired in the statistic acquisition step.

According to the present invention, it is possible to provide an information retrieval apparatus and an information retrieval method by which information matching users' preferences is retrieved more accurately and more speedily.

BRIEF DESCRIPTION OF THE DRAWINGS

FIG. 1 is a block diagram showing a system for creating retrieval indexes used for conventional techniques;

FIG. 4A is the first table showing data that are acquired, used or created in the users' preferences extraction process in the first example;

FIG. 4B is the second table showing data that are acquired, used or created in the users' preferences extraction process in the first example;

FIG. 4C is the third table showing data that are acquired, used or created in the users' preferences extraction process in the first example;

FIG. 4D is the fourth table showing data that are acquired, used or created in the users' preferences extraction process in the first example;

FIG. 4E is the fifth table showing data that are acquired, used or created in the users' preferences extraction process in the first example;

FIG. 6A is a flowchart for a third example in an element evaluation process using user's preferences in the process of deleting effective elements of a vector of retrieval information;

FIG. 6B is a flowchart for a fourth example in an element evaluation process using user's preferences in the process of deleting effective elements of a vector of retrieval information;

FIG. 6C is a flowchart for a fifth example in an element evaluation process using user's preferences in the process of deleting effective elements of a vector of retrieval information;

FIG. 6D is a flowchart for a sixth example in an element evaluation process using user's preferences in the process of deleting effective elements of a vector of retrieval information;

FIG. 7A is a table showing the states in which only the elements that match the user's preferences are left after the evaluation by using the user's preferences, and the other elements were removed in the processes shown in the flowchart in the third example;

FIG. 7B is the first table showing the states in which only the elements that match the user's preferences are left after the evaluation by using the user's preferences, and the other elements were removed in the processes shown in the flowchart in the fourth example;

FIG. 7C is the second table showing the states in which only the elements that match the user's preferences are left after the evaluation by using the user's preferences, and the other elements were removed in the processes shown in the flowchart in the fourth example;

FIG. 7D is a table showing the states in which only the elements that match the user's preferences are left after the evaluation by using the user's preferences, and the other elements were removed in the processes shown in the flowchart in the fifth example;

FIG. 7E is a table showing the states in which only the elements that match the user's preferences are left after the evaluation by using the user's preferences, and the other elements were removed in the processes shown in the flowchart in the sixth example;

FIG. 8A is a first figure showing the conventional vector normalization on which the vector normalization process as a seventh example is based;

FIG. 8B is a second figure showing the conventional vector normalization on which the vector normalization process as a seventh example is based;

FIG. 8C shows results of the vector normalization process executed as the seventh example.

DESCRIPTION OF THE PREFERRED EMBODIMENTS

Figure 2:
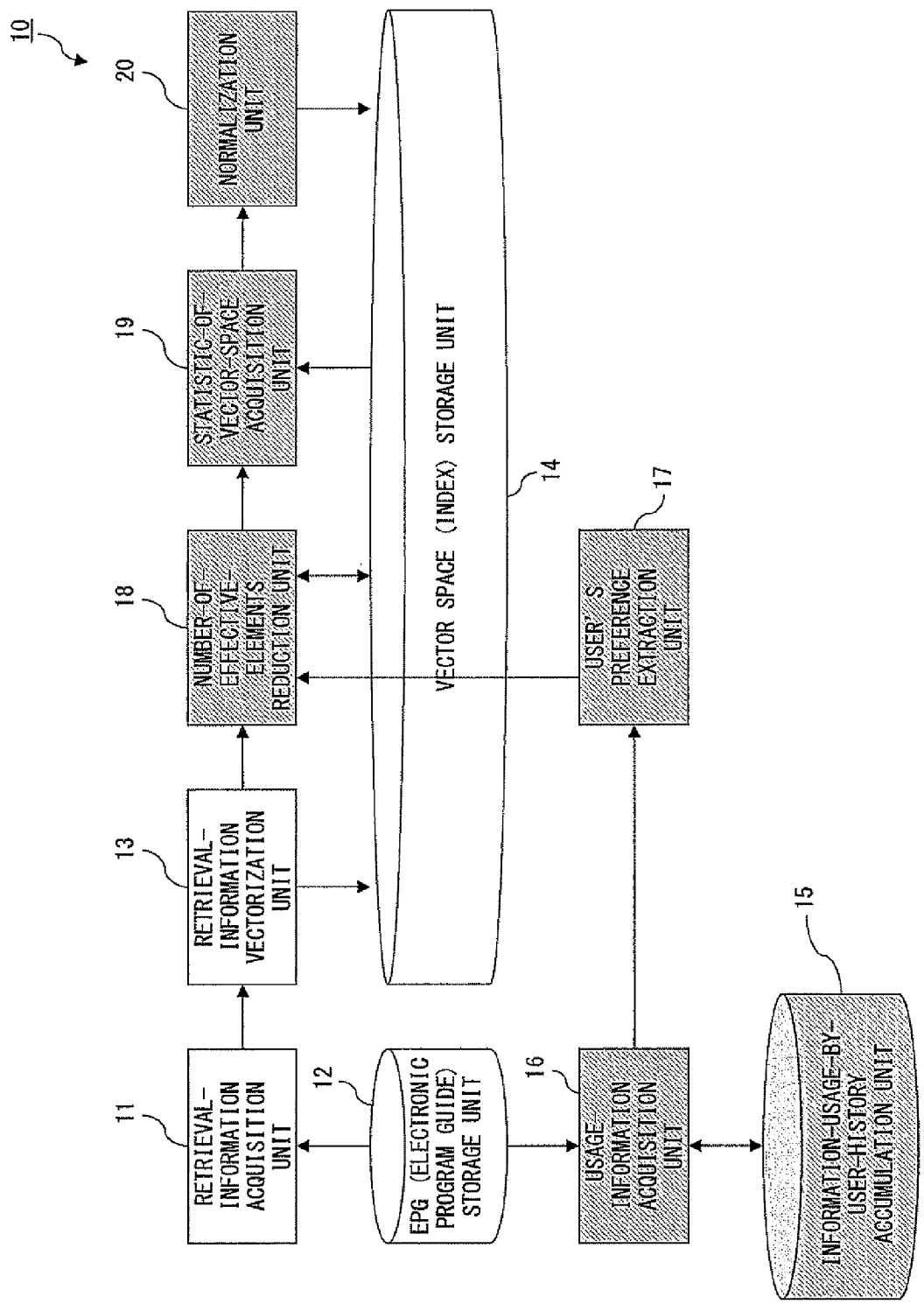
FIG. 2 shows a configuration of a fundamental system of an information retrieval apparatus according to an embodiment of the present invention.

Hereinafter, embodiments of the present invention will be explained by referring to the drawings.

FIG. 2 shows a configuration of a fundamental system of an information retrieval apparatus according to an embodiment of the present invention.

As shown in FIG. 2, a system 10 in the present example comprises an retrieval-information acquisition unit 11, an EPG (Electronic Program Guide) storage unit 12, a retrieval-information vectorization unit 13, a vector space (index) storage unit 14, an information-usage-by-user-history accumulation unit 15, a usage-information acquisition unit 16, a user's preference extraction unit 17, a number-of-effective-elements reduction unit 18, a statistic-of-vector-space acquisition unit 19, and a normalization unit 20.

The retrieval-information acquisition unit 11 is a unit that acquires information as the retrieval target (retrieval information) from an information source.

The EPG (Electronic Program Guide) storage unit 12 stores information on programs that are scheduled to be broadcast on TV, such as program names, words, persons' names, time, and the like that are included in the contents of the programs.

The retrieval-information acquisition unit 11 acquires, from the EPG (Electronic Program Guide) storage unit 12 as the information source, information on programs (programs to be retrieved) that are scheduled to be broadcast and that are the retrieval target.

The retrieval-information vectorization unit 13 arranges, on the vector space, information on the programs that are the retrieval target acquired by the retrieval-information acquisition unit 11.

This vector space is stored in a certain storage area in the vector space (index) storage unit 14.

The base of the vector space (the multidimensional axis of coordinates on the vector space) corresponds to information serving as a retrieval key included in program names and program contents, and the magnitude of the vector space corresponds to a statistic of information serving as the retrieval key.

In the explanation hereinafter, "information serving as retrieval key" is referred to as "keyword". However, "keyword" used in the present example includes any kind of information that can be used as a retrieval key, including not only names of items and names of people, but also, for example, time, particular marks, or the like.

Examples of the statistic of this keyword include TF (term frequency), DF (document frequency), the product of TF and the reciprocal of DF, i.e., "TF×1/DF", and the like.

TF is a frequency with which information such as a particular keyword is included in a program. DF is the number of programs, from among all the programs, that include a particular keyword. The expression "TF×1/DF" obtained from the statistic of the above keyword is the weight of the keyword.

The information-usage-by-user-history accumulation unit 15 is a unit that operates together with a storage unit and stores usage information (information on a program that is not the same as the retrieval information, but similar to it) that is used by a user, and usage data that expresses the manner of usage, e.g., operations such as viewing, recording, playing, fast-forwarding, deletion of the program, and the like.

The usage-information acquisition unit 16 is a unit that acquires, from the information-usage-by-user-history accumulation unit 15 and the EPG (Electronic Program Guide) storage unit 12, information on the program (used program) that was used by a user (in other words, a set of usage information that is information used by a user) and the manner of usage for the respective pieces of usage information.

The user's preference extraction unit 17 is a unit that extracts users' preferences from both the usage information obtained from the usage-information acquisition unit 16 and the manner of usage.

Specifically, the degree to which a user places importance on certain information (degree of importance) is first obtained from the manner of usage. This degree of importance can have positive or negative values, and is proportional to the frequency with which the user uses the information.

Then, by using this degree of importance, weights are assigned to information (keywords) to be used for the retrieval in the usage information. Finally, the keywords that are common among the respective pieces of usage information are extracted, and the sum of the weights of the extracted keywords is obtained. Then, the set including the sum of the keywords is handled as the preference of the user.

This user preference is provided by the user's preference extraction unit 17 to the number-of-effective-elements reduction unit 18 as feedback information.

The number-of-effective-elements reduction unit 18 evaluates the respective elements of the vector of information (retrieval information) by using the preferences of the user obtained by the user's preference extraction unit 17, and determines the elements that are to be removed from the vector.

The number-of-effective-elements reduction unit 18 reduces the number of effective elements of the vector of information (retrieval information) by removing from the vector the elements that do not satisfy the evaluation criterion.

In the present example, an effective element is an element whose value is not zero. In the vector space in the present example, when the value of an element is zero, the element is not on the vector.

By the above processes, the keywords (elements) that do not satisfy the evaluation criterion, and therefore are not important, are deleted from among the effective keywords (elements) of the retrieval target (vector of the retrieval information).

Thereby, the number of keywords (elements) that are effective (not zero) is reduced, which contributes to an increase in retrieval speed.

The statistic-of-vector-space acquisition unit 19 is a unit that acquires the statistic of the vector of the retrieval information. The statistic includes the average number of effective elements (the number of elements whose value is not zero) on the vector of the program to be retrieved, the maximum number of effective elements, the average of the element values of the vector, and the like.

The normalization unit 20 is a unit that normalizes the vector of each piece of information (retrieval information) by using the statistic of the retrieval information obtained by the statistic-of-vector-space acquisition unit 19.

FIRST EXAMPLE

Hereinbelow, examples realized by using the above configuration of a fundamental system of an information retrieval apparatus are explained. In the first example explained below, the case is assumed in which programs that match users' preferences are searched for by using an information device by which TV programs and video images can be viewed and recorded.

Figure 3:
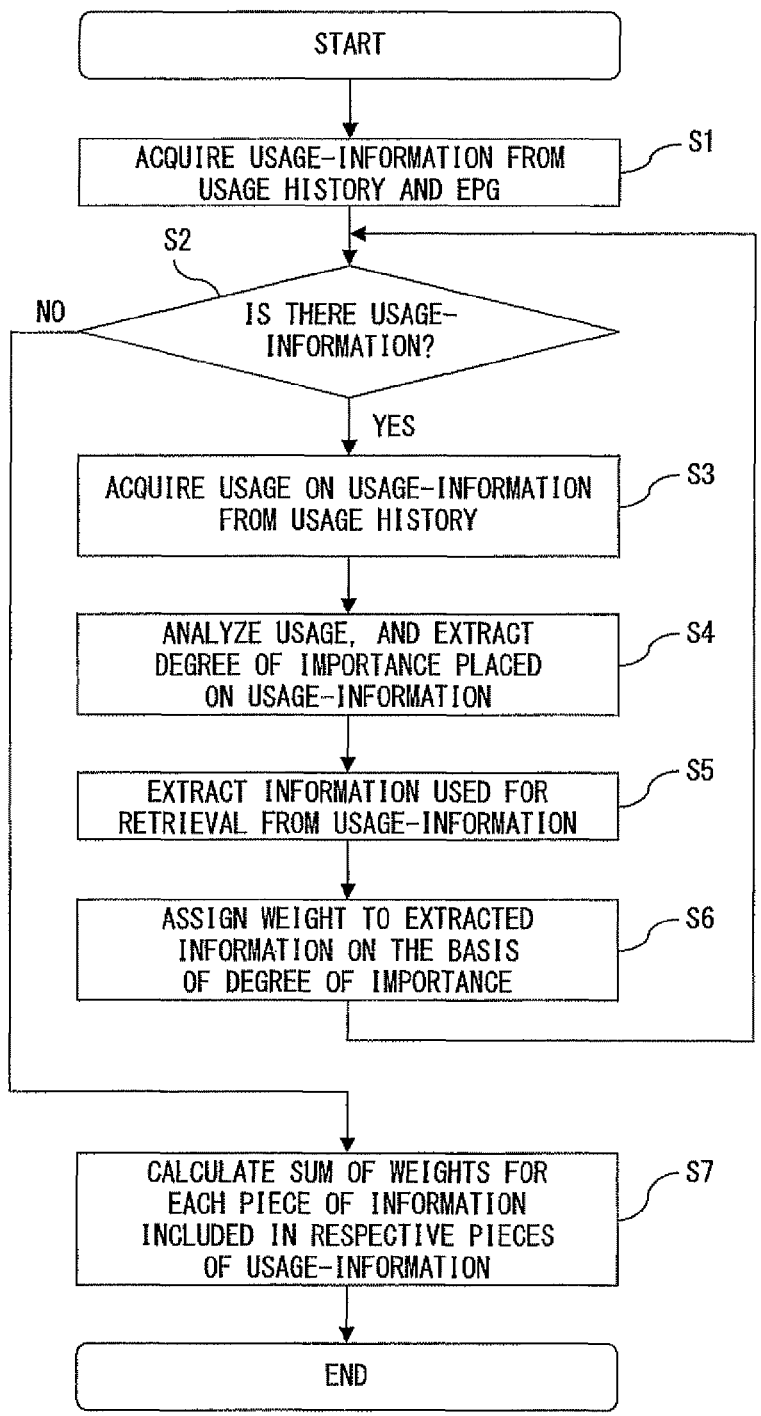
FIG. 3 is a flowchart showing operations of a process for extracting users' preferences in a first example.

FIG. 3 is a flowchart showing operations of the above described process for extracting users' preferences in the first example.

FIGS. 4A through 4E are tables respectively showing data that are acquired, used, or created in the process shown in the flowchart in FIG. 3.

In FIG. 3, first, usage information is acquired from the usage history and the EPG (step S1).

This process is a process in which the usage-information acquisition unit 16 acquires a list of information used by a user (usage information) and a history of the usage of the respective pieces of information by referring to the EPG information stored in the EPG (Electronic Program Guide) storage unit 12 and the history of usage performed by a user stored in the information-usage-by-user-history accumulation unit 15.

Thereby, a list, shown in FIG. 4A, of information (usage information) used by a user (a list of the used programs in the present example), and a history of the usage shown in FIG. 4B (history of the manner of usage, i.e., in the present example, the history of recording, playing, viewing, fast-forwarding, fast-reversing, stopping, pausing, and deleting on the respective programs) are acquired.

In the list, shown in FIG. 4A, of information (usage information) used by the user, an information ID column 21, a program name column 22, a program contents column 23, and a category column 24 are included respectively from left to right.

In the information ID column 21, ID numbers assigned exclusively to pieces of usage information are written as 001, 002, 003, 004, . . . in ascending order from top to bottom.

In the program name column 22, the pieces of usage information (program names in the present example) corresponding to the ID numbers in the information ID column 21 are written as "Junjou Kirari", "FIFA World Cup 2006", "High school baseball tournament", "FIFA World cup 2006", etc.

On the basis of the information written in the program name column 22, it is understood that the corresponding user places importance on "FIFA World cup 2006".

In the program contents column 23, the program names corresponding to the ID numbers in the information ID column 21 are written as "Miyazaki Aoi . . . ", "Final match: Italy versus France . . . ", "Kanagawa prefecture, third round, first game . . . ", "Semi-final . . . ", etc.

In the category column 24, the categories corresponding to the ID numbers in the information ID column 21 are written as "Drama", "Sports", "Sports", "Sports", etc.

On the basis of the information written in the category column 24, it is understood that the corresponding user places importance on the category of "Sports".

Also, in the history of usage shown in FIG. 4B, a usage history ID column 25, a usage date-and-time column 26, a usage-target-information ID column 27, and a usage-manner column 28 are written in the order from left to right.

In the usage history ID column 25, ID numbers assigned exclusively to the usage histories are written as 001, 002, 003, 004, 005 . . . , in ascending order starting from the top and going to the bottom.

In the usage date-and-time column 26, the time and date corresponding to the ID numbers in the usage history ID column 25 are written as "2006/9/28 15:00", "2006/9/18 12:00", "2006/9/25 20:00", "2006/9/25 22:00", "2006/9/25 26:00", etc., respectively from top to bottom.

In information-ID-of-usage-target column 27, the information IDs of usage targets corresponding to the ID numbers in the usage history ID column 25, in other words, the numbers in the information ID column 21 corresponding to the program names in the program name column 22 used by the user, are written as "001", "002", "002", "004", "003", etc., respectively from top to bottom.

In the usage-manner column 28, the manners of usage corresponding to the ID numbers in the usage history ID column 25 are written as "Recording", "Playing", "Playing", "Playing", "Playing", etc., respectively from top to bottom.

In the list of usage histories, the data of time and date of usage in the usage date-and-time column 26 corresponding to "Recording" in the usage-manner column 28, i.e., "2006/9/28 15:00" is also usage information that can be a retrieval key in the future.

Next, in FIG. 3, it is determined whether or not there is usage information (step S2).

As shown in FIG. 4A, pieces of usage information whose ID numbers are "0001" or larger that were read from the information-usage-by-user-history accumulation unit 15 by the usage-information acquisition unit 16 remain unprocessed (Yes in S2).

Accordingly, in this case, the usage of the usage information having the smallest number ("001" in the first process step) as the usage that has not been processed is acquired from the usage history (step S3).

In this process, first, numbers of information IDs in the usage-target-information ID column 27, e.g., "001", "002", "002", "004", and "003", etc., are acquired, from the list of the history of usage shown in FIG. 4B, as data corresponding to the usage information.

Then, as data corresponding to these pieces of usage information, the manners of usage in the usage-manner column 28, e.g., "Recording", "Playing", "Playing", "Playing", "Playing", etc., are acquired.

Next, in FIG. 3, the user's preference extraction unit 17 shown in FIG. 2 analyzes the usage and extracts the "degree of importance" placed on the usage information (step S4).

In this process, the user's preference extraction unit 17 extracts the degree of importance placed by users on each piece of usage information (information ID) on the basis of the usage (manner of usage) acquired in the process of step S3.

The "degree of importance" is determined in the design phase of the process program. For example, "+2", "+2", "−1", and "−2" are respectively assigned to manners of usage, i.e., "Viewing", "Recording", "Playing", "Fast-forwarding", or "Deleting", on a TV program.

As an example of the degree of importance for each information ID of the manner of usage, "degree of importance" with respect to information ID "001" is "+2" as shown in FIG. 4C because "Recording" is performed once as written in the usage-target-information ID column 27 and the usage-manner column 28 in the history of usage shown in FIG. 4B.

Also, with respect to information ID "002", "Playing" is performed twice as written in the usage-target-information ID column 27 and usage-manner column 28 in the history of usage shown in FIG. 4B; accordingly, the "degree of importance" with respect to information ID "002" is "+4".

In a similar manner, the degrees of importance of the respective information IDs are extracted such that the "degree of importance" with respect to information ID "003" is "+2", the "degree of importance" with respect to information ID "004" is "+2", and the degree of importance" with respect to information ID "0051" is "+2.

The list of the degrees of importance shown in FIG. 4C shows the results, in their organized state, obtained in the case when the processes in steps S2 through S4 in FIG. 3 are repeated.

Next, information used for retrieval is extracted from the usage information in FIG. 3 (Step s5).

In this process, information to be used for retrieval, i.e., information that is used as retrieval keys and keywords, is extracted from the list of the information used by users (usage information) shown in FIG. 4A.

In the present example, information obtained by separately writing the program names, program contents, and categories via morphological analysis is extracted as keywords.

Thereby, as written in the information ID column 21 and in an information-used-for-retrieval column 30 in the list of information and weights shown in FIG. 4D to be used for retrieval, "Joujou", "Kirari", "Miyazaki", "Aoi", and "Drama" are extracted as information (retrieval keys/keywords) corresponding to information ID "001" from the "Joujou kirari" written in the program name column 22, "Miyazaki Aoi" written in program contents column 23, and "Drama" written in the category column 24 that correspond to information ID "001" shown in FIG. 4A.

Similarly, "FIFA", "Worldcup", "2006", "Final", "Italy", "France", and "Sports", etc. are extracted as the keywords corresponding to information ID "002" in this example.

Also, "High school", "Baseball", "Kanagawa prefecture", "Third round", "First game", "Sports", etc. are extracted as the keywords corresponding to information ID "003". Further, "FIFA", "World cup", "2006", "Semi-final", "Sports", etc. are extracted as the keywords corresponding to information ID "004".

Also, this list shows the results, in their organized state, obtained when the processes in steps S2 through S5 in FIG. 3 are repeated.

Next, in FIG. 3, a weight is assigned to the extracted information on the basis of the degree of importance (step S6).

In this process, the values of degrees of importance written in the importance degree column 29 in the list of degrees of importance shown in FIG. 4C, i.e., 2, 4, 2 . . . , are directly set as the values of weights 2, 4, 2 . . . in the weight column 31 in the list of information and weights used for usage information shown in FIG. 4D.

The values of weights set in the weight column 31, i.e., 2, 4, 2 . . . , are assigned to each keyword written in the information-used-for-retrieval column 30 that is used for the corresponding retrieval.

Then, the process returns to step S2, and the processes in steps S3 through S6 and S2 are repeated on all the pieces of information written in the information ID column 21 in the list of information (usage information) used by the user shown in FIG. 4A.

Thereby, the list of information and weights used for retrieval included in the usage information shown in FIG. 4D is created on the basis of the list of information (usage information) used by users, the list of history of usage, and the list of degrees of importance of information shown respectively in FIGS. 4A, 4B, and 4C.

Then, in step S2 in FIG. 3, when there is no usage information (No in S2), the sum of weights is calculated for each piece of information included in the respective pieces of usage information (step S7).

In this process, the list of sums of weights (users' preferences) of information common among the respective pieces of information shown in FIG. 4E is created on the basis of the list of information and weights used for retrieval shown in FIG. 4D.

In this list, the respective keywords (information used for retrieval) written in the information-used-for-retrieval column 30 shown in FIG. 4D are shown independently.

Specifically, in an information-used-for-retrieval column 32 in the list of sums of weights (users' preferences) of information common among the respective pieces of information shown in FIG. 4E, keywords used for retrieval such as FIFA, World cup, 2006, Final, Italy, France, Semi-final, etc. are written from top to bottom.

Also, with respect to these keywords to be used for the retrieval, the sums of the weights of information common among the respective pieces of usage information, i.e., 8, 6, 6, 6, 4, 4, 4, 4, are written in descending order from top to bottom of a weight column 33.

In this case, the weight "8" for "Sports" is obtained by the expression 4+2+2=8 on the basis of the keyword "Sports" corresponding to information ID "002" in FIG. 4D having the weight of "4", and the keywords "Sports" respectively corresponding to information IDs "003" and "004" each having the weight "2".

The same rule is applied to other weights, written in the weight column 33, corresponding to other keywords written in the information-used-for-retrieval column 32.

Thereby, the preferences of users with respect to the respective keywords included in the retrieval information are acquired as the sums of the weights written in the weight column 33.

It is desirable that the weight of information used for retrieval be held, as the preferences of users as shown in FIG. 4E, in a certain storage area in a storage device such as, for example, information-usage-by-user-history accumulation unit 15.

Thereby, according to the first example of the present invention, user's preferences can be acquired in a quantified state on the basis of usage performed by the users on usage information.

SECOND EXAMPLE

Figures 5A, 5B:
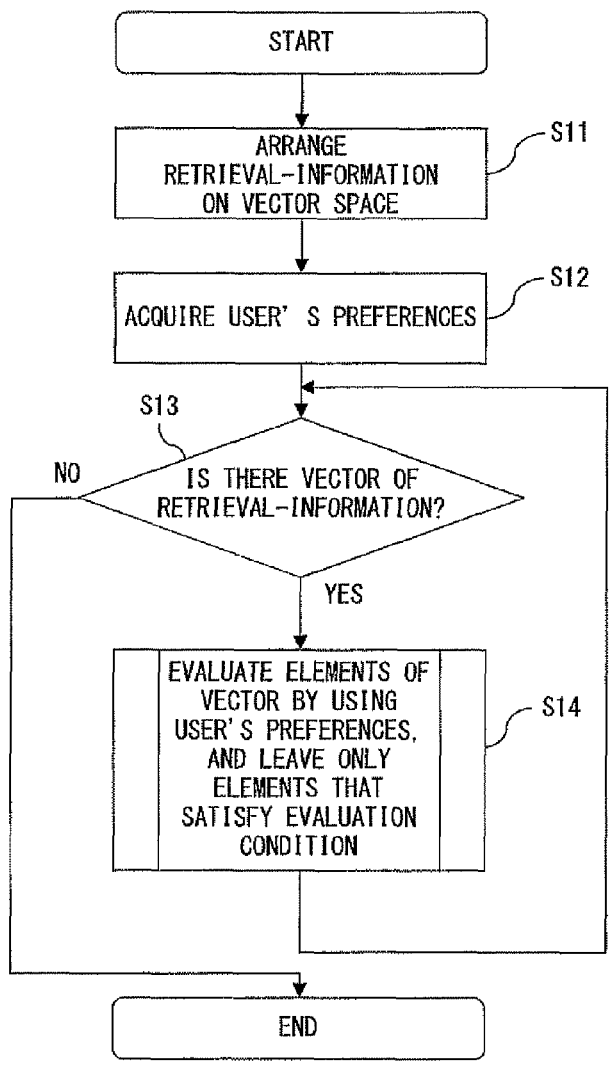
FIG. 5A is a flowchart showing processes of deleting effective elements of a vector of retrieval information executed in a second example.
FIG. 5B shows vectors of retrieval information arranged on the vector space in the process shown in FIG. 5A, and the elements before deletion.

FIGS. 5A and 5B show processes in a second example. FIG. 5A shows the processes that follow the above processes of extracting the users' preferences and is a flowchart for the process of evaluating effective elements of the vector of the retrieval information in order to reduce the elements having low importance.

FIG. 5B shows the vectors of the retrieval information arranged on the vector space and the effective element for each vector before the reduction.

In the reduction of the effective elements in the present example, effective elements having low importance are reduced by using the user's preferences that have been extracted beforehand.

In FIG. 5A, the retrieval information is first arranged on the vector space (step S11).

In this process, the retrieval-information acquisition unit 11 acquires, from the EPG (Electronic Program Guide) storage unit 12 as the information source, the information (retrieval information) of the programs that are scheduled to be broadcast. Then, the retrieval-information vectorization unit 13 arranges the information on the respective programs on the vector space as shown in FIG. 5B.

In FIG. 5B, the vectors of the retrieval information arranged on the vector space are represented by "001", "002", etc. in the information ID column 21. The elements constituting the respective vectors are represented in an element 1 column 41, an element 2 column 42 ... an element 21 column 61, an element 22 column 62, etc.

The element values added to the effective elements of the respective vectors on the vector space, such as the "2.4" and "2.6" that are the values of "Junjou" as element 1, and "Kirari" as element 2 in vector "001", show the example obtained by "TF×1/DF" that is one method of calculating the statistic of the keywords.

Next, the user's preferences are acquired (step S12).

In this process, the user's preferences (information and weights used for retrieval shown in FIG. 4E) stored on a certain storage area in the information-usage-by-user-history accumulation unit 15 is read and is temporarily stored in a RAM (random access memory) unit (not shown) or the like.

Next, it is determined whether or not there is a vector of the retrieval information (step S13).

In this process, in the first processing cycle, there is at least one vector of the retrieval information arranged on the vector space in step S11 (Yes in step S13).

Accordingly, in this case, the elements of the vector are evaluated by using the user's preferences, and only the elements that satisfy the evaluation condition are left (step S14).

This process is a process in which the respective elements of the vectors of the respective programs shown in FIG. 5B are evaluated by using the user's preferences, and only the elements that satisfy the evaluation condition are left while the other elements are removed.

As above, according to the second example of the present invention, the number of effective elements of the vector of the retrieval information can be reduced on the basis of the users' preferences; accordingly, it is possible to cause the processing time for retrieval to be within a certain value.

Also, when the number of dimensions is reduced, important keywords that tend to be included in retrieval conditions are not removed, and accordingly it is possible to increase processing speed while maintaining high retrieval accuracy.

OTHER EXAMPLES

FIGS. 6A, 6B, 6C and 6D are flowcharts respectively showing that there are at least four (i.e., first through fourth) process methods of evaluation in the processes of evaluating the elements by using the users' preferences in step S14 above.

FIGS. 7A through 7E are tables showing the states in which only the elements that match the user's preferences are left after the evaluation using the user's preferences, and the other elements were removed in the processes shown in the respective flowcharts.

THIRD EXAMPLE

First, as a third example, a first process method is shown in FIG. 6A. In the first process method shown in FIG. 6A, elements of the vector are sorted in descending order of weight of the user's preference (step S14-1-1).

The matrix of the vectors and the elements of the retrieval information shown in FIG. 5B are created by sorting the respective elements in descending order of weight of the user's preference as described above.

Next, in FIG. 6A, the number-of-effective-elements reduction unit 18 removes all the elements except for a certain number counting from the top of the list of the sorted elements (step S14-1-2).

In the present example, it is set in the setting phase that twenty elements counting from the top of the list not be removed. Accordingly, in the vector of the retrieval information and the matrix of the elements shown in FIG. 5B, the twenty elements corresponding to the element 1 column through the element 21 column are not removed, and the elements corresponding to the element 21 column and the subsequent element columns (the elements that are colored in black) are removed.

As described above, according to the third example, elements are discriminated between elements to be removed from the vector and elements not to be removed from the vector by using the user's preferences. Accordingly, elements that tend to be included in the retrieval conditions and are important in view of the statistical characteristic of the retrieval information can remain in the vector, and it is thus possible to increase the processing speed while maintaining a high retrieval accuracy.

In other words, the number of elements of a vector of the retrieval information that is the retrieval target is reduced to at most, for example, twenty, on the basis of the user's preferences, and accordingly the retrieval time for the vector space is reduced.

Also, the elements of the vector that are not removed are listed in descending order of the weight of the user's preferences. Accordingly, the retrieval of programs that match the user's preferences, i.e., a highly accurate retrieval, is realized.

FOURTH EXAMPLE

Next, as a fourth example, the second process method is shown in FIG. 6B. In the second process method shown in FIG. 6B, first, the weights of the elements of the vector and the weights of the user's preferences corresponding to the weights of the elements of the vector are multiplied together (step S14-2-1).

Next, the elements are sorted in descending order of their multiplied weights (step S14-2-2).

Via the above two steps, the vector of the retrieval information and the matrix of the elements shown in FIG. 7B are obtained.

Specifically, the element value (weight of the element) of the element "Junjou" in the element 1 column of information ID "001" shown in FIG. 5B was "2.4", and when the weight "2" of the user's preferences shown in FIG. 4E is multiplied, the element value becomes "4.8" and the element is written in the element 2 column after the performance of sorting in the matrix shown in FIG. 7B.

In FIG. 4E, the weights are listed in descending order, and the "2" that is the weight of the "Junjou" is omitted; however, in FIG. 4D, the keyword "Junjou" is written only once in the information ID having the weight "2", and accordingly the weight is "2" in the "user's preference" shown in FIG. 4E.

Similarly, the element value of the element "Kirari" in the element 2 column of information ID "001" shown in FIG. 5B was "2.6", and when the weight "2" of the user's preference shown in FIG. 4E is multiplied with this value of "2.6", the element value becomes "5.2" and the element is written in the element 1 column after the performance of sorting in the matrix shown in FIG. 7B.

The respective elements having the other information IDs are multiplied by the weights of the users' preferences similarly to the above manner, and are written in matrixes after the performance of sorting as shown in FIG. 7B.

Next, in FIG. 6B, the number-of-effective-elements reduction unit 18 leaves (does not remove) only the elements whose weights of the elements that were multiplied by the user's preferences are greater than a criteria value (step S14-2-3).

In this process, in the present example, the computer program is written such that the elements greater than the element value "2.0" are left.

Accordingly, as shown in FIG. 7C, the elements "Italy" and "France" whose element values are "2.0" are removed from the matrix shown in FIG. 7B.

As described above, according to the fourth example, elements are discriminated between elements to be removed from the vector and elements to be left in the vector by using the values obtained by multiplying the user's preferences and the element value that is defined by the statistic of the retrieval information. Accordingly, elements that tend to be included in the retrieval conditions and are important in view of the statistical characteristic of the retrieval information can remain in the vector, and it is thus possible to increase the processing speed while maintaining a high retrieval accuracy.

FIFTH EXAMPLE

Next, as a fifth example, the third process method is shown in FIG. 6C.

The first step, S14-3-1, and the second step, S14-3-2, in the third process method shown in FIG. 6C are the same as steps S14-2-1 and S14-2-2 in the second process method shown in FIG. 6B.

Subsequently to the above processes, the number-of-effective-elements reduction unit 18 removes all the elements except for a certain number counting from the top of the list of the sorted elements (step S14-3-2).

Also in this process, the computer program is written such that the elements in the top twenty are left.

Accordingly, the top twenty elements corresponding to the element 1 column through the element 20 column are left in the matrix shown in FIG. 7B, and the elements corresponding to the element 21 column and the subsequent columns (the elements colored in black) are removed from the matrix shown in FIG. 7D.

However, in the present example, being different from the cases shown in FIGS. 6A and 7A, the elements are not sorted in descending order of the weights of the user's preferences, but are sorted in descending order of the weight obtained by multiplying the element values and the weights of the user's preferences.

Thereby, according to the fifth example, the elements of the vector of the retrieval information are sorted in descending order of importance as the retrieval condition, and the elements greater than the prescribed element value are removed; accordingly, it is possible to increase the processing speed while maintaining a high retrieval accuracy. Also, the maximum number of effective elements can be known, and thus it is possible to understand the maximum processing time before performing a retrieval.

SIXTH EXAMPLE

The fourth process method is shown in FIG. 6D as the sixth example.

In the fourth process method shown in FIG. 6D, the first process step S14-4-1 and the second process step S14-4-2 are the same as steps S14-2-1 and S14-2-2 in the second process method shown in FIG. 6B.

In the present example, the number-of-effective-elements reduction unit 18 leaves only the elements that are equal to or greater than the prescribed criteria value and are within the prescribed number, and removes the other elements (step S14-4-3).

In this process, in the present example, the computer program is written such that the elements that have an element value equal to or greater than "5.0" and that are within the top twenty in the list are left.

As shown in FIG. 7E, in the vector having the information ID "001", only the element "Kirari" having the element value "15.2" is left and the other elements (the shaded elements) are deleted from the matrix shown in FIG. 7B.

Also, in the vector having the information ID "002", the element values of the elements in the element 20 column and in the previous columns are equal to or greater than "5.0"; accordingly, all the elements in the element 20 column and in the previous columns that include "Sports" and "World cup" are left, and all the elements in the element 21 column and in the subsequent columns that include "Italy" and "France" whose element value is less than "5.0" are deleted.

In the vector having the information ID "003", the element "High school" that is in the element 1 column and that has an element value equal to or greater than "5.0" and the element "Baseball" that is in the element 2 column and that has an element value equal to or greater than "5.0" are left, and all the elements that are in the element 3 column and the subsequent columns and that have an element value of less than "5.0" are deleted.

As described above, according to the sixth example of the present invention, the elements of the vector of the retrieval information are sorted in descending order of importance as the retrieval condition, and the number of elements equal to or greater than the prescribed number or the elements equal to or smaller than the prescribed element value are removed; accordingly, it is possible to increase the processing speed while maintaining a high retrieval accuracy.

SEVENTH EXAMPLE

Example of Conventional Normalization

In the above, it is stated that the conventional cosine normalization in the vector space decreases retrieval accuracy. This will be explained by using specific examples. Thereafter, the normalization of vectors in the present invention will be explained as a seventh example.

FIGS. 8A and 8B show the conventional normalization of a vector. FIG. 8C shows results of the normalization process of a vector according to the present invention.

When elements of a vector are examined using a statistic of the vector space of the retrieval information, it is sometimes found that the amount of information (the number of elements) that is affected by the vector of the retrieval information greatly varies, as shown in FIG. 8A.

Specifically, as shown in FIG. 8A, the vector having the information ID "001" has an information amount of forty-two elements (from element 1 column 41 through element 42 column 82). In contrast, the vector having the information ID "002" has the information amount only of two elements (element 1 column 41 and element 2 column 42).

In other words, the vector having the information ID "001" has a very large number of elements (the vector is long), and the vector having the information ID "002" has a very small number of elements (the vector is short).

However, in both of the vectors, the elements in element 1 column 41 are "Junjou", and the elements in element 2 column 42 are "Kirari". Also, in the present example, the element values obtained from the statistic of each element are the same; specifically, the element value of the element "Junjou" is "2.4", and the element value of the element "Kirari" is "2.6".

In order to level the variations in the information amounts in the vector, cosine normalization has been performed in the conventional method. Cosine normalization is performed for the purpose of performing retrieval on the basis of the measures of the angles between the vector expressing a set of the retrieval keys and the information (each vector on the vector space) on the retrieval target by making the lengths of the vectors identical to each other. The smaller the angle, the closer to the query vector it is and the higher the suitability of the vector.

The vector obtained via this cosine normalization is expressed by the equation below.

Normalize(P)=P/|P|

In the above equation, P is the vector of the retrieval information (W1, W2, W3, . . . , Wn), n is the number of elements of the vector, Wi (i=1, 2 . . . , n) is the weight of each element, and |P| is the length of the vector. The length of the vector |P| is expressed by equation 1 below.

$$|P| = \sqrt{\sum_i^n (W_i)^2}$$ [Equation 1]

As a result of this equation, the weights of elements of the two vectors as shown in FIG. 8B are obtained.

In other words, in the vector having the information ID "001", the weight of each element has changed into 1/10 of the weight before the normalization shown in FIG. 8A. It can be assumed that the weight has become 1/10 because, via the cosine normalization, the length of the vector having the information ID "001" became 1/10 of the length before the normalization.

In the vector having the information ID "002", the weight of each element has changed into approximately 2.8/10 of the weight before the normalization shown in FIG. 8A. It can be assumed that although the length of the vector having the information ID "002" has become the same as that of the vector having the information ID "001", the weight of each element became greater than that of the vector having the information ID "001" because there are only two elements.

In FIG. 8B, when the element of the vector having the information ID "001" and the element of the vector having the information ID "002" are compared, it is understood that the elements "Junjou" and "Kirari" that had the same weight in the respective vectors have changed into a weight approximately 2.8 times greater in the vector having the information ID "001" than in the vector having the information ID "002" after the cosine normalization.

As described above, in the conventional cosine normalization, elements that had the same weight change after normalization into elements having greatly different weights depending upon the lengths (the number of elements included) of the vectors to which the respective elements belong.

Similarly, when values (retrieval keys) of the same elements are greatly different from each other, the retrieval accuracy is affected by the difference, which is problematic.

Example of Normalization in the Present Invention

In order to solve the above problem, in the seventh example of the present invention normalization on vectors is performed while taking into consideration the statistical characteristics of information amounts i.e., variations of information amounts.

Specifically, when normalizing vectors, attention is focused not on the length of a vector but on the number of effective elements (elements whose values are not zero) of a vector, and information (the number n of effective elements) whose number of effective elements is smaller than the average number of effective elements of the vector space (N-dimension) is normalized after the average value (AW) of elements on the vector space is compensated by the difference (N−n).

It is also possible to use, instead of the average number of effective elements, the median value of the maximum number of effective elements or the number of effective elements.

The vector based on the above concept in the present example is expressed by the equation below.

Normalize(P)=P/|P'|

In the above equation, P is the vector of the retrieval information (W1, W2, W3, . . . Wn), n is the number of elements of the vector, Wi (i=1, 2 . . . , n) is the weight of each element, and |P'| is the length of the vector in which the average weight was compensated. |P'| is expressed by the equation below.

$$|P| = \sqrt{\sum_i^n (W_i)^2 + \sum_j^{N-n} (AW_j)^2}$$ [Equation 2]

AWj is the average weight of the elements on the entire vector space of this retrieval information. N is the average number of effective elements (or the maximum number of effective elements, or the median value of the number of effective elements) of the vector of the vector space of this retrieval information.

The result of the normalization in the seventh example of the present invention is shown in FIG. 8C as an example.

FIG. 8C shows the results of the calculations in which the above normalization equation according to the seventh example is used on the vectors respectively having the information IDs "001" and "002" shown in FIG. 8A on the condition that the average number of elements is 10 and the average weight of the elements is 1.5.

In FIG. 8C, when the vector elements respectively have the information IDs "001" and "002", it is understood that the elements "Junjou" and "Kirari" that had the same weight in the respective vectors have changed into a weight almost 2 times greater in information ID "002" than in information ID "001" after the normalization according to the seventh example of the present invention.

As described above, according to the seventh example of the present invention, variations in information amounts (amounts of elements) can be leveled by the normalization of vectors in which a statistical characteristic of a vector space is taken into consideration.

Accordingly, even weights of vectors that have an extremely small number of elements are leveled, and thereby a highly accurate retrieval is realized.

Additionally, even after performing the normalization according to the seventh example of the present invention, weights of the information (elements) that are included in both of the vectors respectively having the information IDs "001" and "002" (such as, for example, the elements "Junjou" and "Kirari" in the above example) are still different from each other.

However, this is because the respective pieces of information (elements) have a different importance in the vectors respectively having the information IDs "001" and "002", and thus they do not have to have the same value.

EIGHT EXAMPLE

Figure 9:
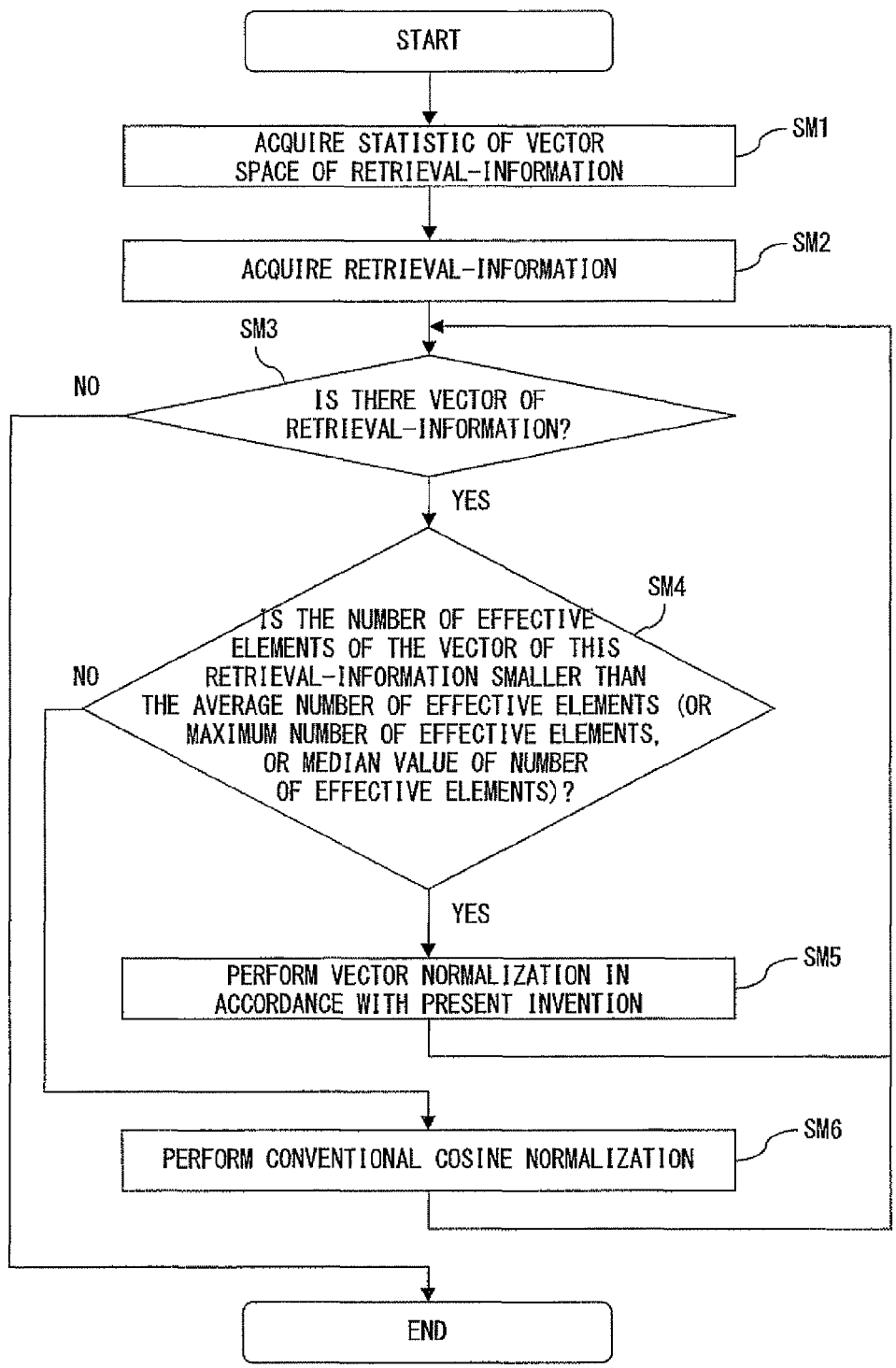
FIG. 9 is a flowchart showing a method of creating information retrieval indexes including a normalization process of vectors according to an eighth example of the present invention.

FIG. 9 is a flowchart showing a method of creating an information retrieval index including a normalization process of vectors according to an eighth example of the present invention.

In FIG. 9, first, a statistic of the vector space of retrieval information is acquired (step SM1).

In this process, the average number of effective elements of the vector of the vector space of the retrieval information is acquired, the maximum number of effective elements of the vector is acquired, and the median value of the number of effective elements of the vector is acquired.

Next, retrieval information is acquired (step SM2). In this process, all the vectors of the retrieval information are acquired.

Next, it is determined whether or not there is a vector of retrieval information (step SM3).

In this process, in the first processing cycle, there is at least one vector of the retrieval information acquired in step SM2 (Yes in step SM3).

Accordingly, in this case, it is determined whether or not the number of effective elements of the vector of the retrieval information is smaller than the average number of effective elements (or the maximum number of effective elements, or the median value of the number of effective elements; the same hereinafter) obtained in the process in step SM1 (step SM4).

When the number of effective elements of the vector of the retrieval information is smaller than the average number of effective elements (Yes in step SM4), the normalization according to the seventh example of the present invention is performed (step SM5).

Thereby, the indexes of the vector space having a high retrieval accuracy as explained by referring to FIG. 8C are stored in the vector space (index) storage unit 14.

Also, when the number of effective elements of the vector of the retrieval information is not smaller than the average number of effective elements (No in SM4), it is determined that the vector of that retrieval information has a relatively high number of effective elements, and the conventional cosine normalization is performed (step SM6).

As described above, when it is determined that the retrieval accuracy does not deteriorate even when the conventional cosine normalization is employed, the vector is normalized by using the cosine normalization that allows a high speed calculation, and the result is stored in the vector space (index) storage unit 14.

After one of the above steps SM5 or step SM6 is completed, the process returns to the determination step SM3, and the processes in steps SM3 through SM6 are repeated.

Then, after the normalization of the vectors of all the pieces of retrieval information is completed and the vectors of all the pieces of retrieval information are stored as indexes in the vector space (index) storage unit 14, it is determined in step SM3 that there was no vector of the retrieval information acquired in step SM2 (NO in SM3); accordingly, the processes for the vector normalization is terminated.

As described above, according to the eight example of the present invention, it is possible to retrieve, for example, TV programs or video images with a high retrieval accuracy and in a short processing time because highly accurate retrieval indexes are created at a high processing speed.

Naturally, an information retrieval apparatus and an information retrieval method according to the present invention can be applied to any type of information retrieval, and can also be applied to an information device and a method for searching for TV programs or video images, as are used as implementation examples in the above respective examples.

What is claimed is:

1. An information retrieval apparatus by which a user retrieves information, comprising:
   a program information storage unit storing program information of a program including a plurality of retrieval keys;
   a usage history information storage unit storing usage history information indicating a history of operation content of the program that a user has made; and
   a computer processing unit connected to a memory comprising:
     an information acquisition unit acquiring the usage history information from the usage information storage unit, acquiring the program information of the program that the user operated from the program information storage unit, and acquiring a degree of importance information indicating a degree of importance of a user operation;
     a weight calculation unit calculating a weight of a retrieval key included in the program information of the program that the user operated by using the usage history information, the program information, and the degree of importance information acquired by the information acquisition unit;
     a user's preference tendency extraction unit extracting a sum of a weight of the plurality of retrieval keys calculated by the weight calculation unit as information indicating a tendency of a preference of the user;
     a statistic acquisition unit acquiring one of an average number of effective elements, a maximum number of effective elements, and a median value of the number of the effective elements as a first statistic, and acquiring an average value of weight of the effective elements as a second statistic, wherein effective elements are elements whose values are not zero; and
     a normalization unit comparing a number of elements of the vector of the program information with the first statistic, and when the number of the elements of the vector is smaller than the fist statistic and normalizing the vector of the program information by using a length of a normalizing vector which is expressed by the equation $$\sqrt{\sum_{i}^{n} (W_i)^2 + \sum_{j}^{N-n} (AW_j)^2},$$

wherein n is the number of effective elements, $W_i$ is the weight of element i, N is the first statistic and $AW_j$ is the second statistic.

2. The information retrieval apparatus according to claim 1, comprising:
   an information vectorization unit arranging as a vector, on a vector space whose axis is retrieval key information, the program information acquired by the information acquisition unit; and
   a number-of-effective-retrieval-keys reduction unit reducing a number of vectors that are effective as retrieval keys from among the vectors of the program information arranged by the information vectorization unit on the vector space, wherein:

the number-of-effective-retrieval-keys reduction unit reduces the number of the effective retrieval keys of the vectors of the program information by:

evaluating retrieval keys of the vectors of the program information by using the information indicating the tendency of the preference of the user obtained by the user's preference tendency extraction unit; and removing the retrieval keys not satisfying an evaluation criterion.

3. The information retrieval apparatus according to claim 2, wherein:

when the number-of-effective-retrieval-keys-reduction unit evaluates the vector of the program information as the retrieval key:

a weight of the retrieval key of the vector of the program information is multiplied by a weight of the preference of the user corresponding to the retrieval key; and it is evaluated whether or not the weight of the retrieval key that was multiplied by the weight satisfies the evaluation criteria.

4. The information retrieval apparatus according to claim 2, wherein:

when the number-of-effective-retrieval-keys-reduction unit evaluates the vector of the program information as the retrieval key:

a weight of the retrieval key of the vector of the program information is multiplied by a weight of the preference of the user corresponding to the retrieval key; and retrieval-keys having a weight equal to or lighter than a prescribed weight are removed from among the weights of retrieval keys that were multiplied by the weight.

5. The information retrieval apparatus according to claim 2, wherein:

when the number-of-effective-retrieval-keys-reduction unit evaluates the vector of the program information as the retrieval key:

a weight of the retrieval key of the vector of the program information is multiplied by a weight of the preference of the user corresponding to the retrieval key;

the retrieval keys are sorted in descending order of weight of the retrieval keys multiplied by the weight; and the number of the retrieval keys equal to or greater than the prescribed number of retrieval keys is removed.

6. The information retrieval apparatus according to claim 4, wherein:

when the number-of-effective-retrieval-keys-reduction unit evaluates the vector of the program information as the retrieval key:

a weight of the retrieval key of the vector of the program information is multiplied by a weight of the preference of the user corresponding to the retrieval key;

retrieval keys are sorted in descending order of weight of the retrieval keys multiplied by the weight; and the number of the retrieval keys equal to or greater than the prescribed number of the retrieval keys or the retrieval keys whose weights are equal to or less than a prescribed weight are removed.

7. A television program information retrieval apparatus by which a user retrieves information, comprising:

a computer processing unit connected to a memory comprising:

a program-information acquisition unit acquiring from an information source program information that comprises retrieval keys;

a program-information vectorization unit arranging, on a vector space, the program information acquired by the program-information acquisition unit;

a statistic acquisition unit acquiring one of an average number of effective elements, a maximum number of effective elements, and a median value of the number of the effective elements in the vector space as a first statistic, and acquiring an average value of weight of the effective elements in the vector space as a second statistic, wherein effective elements are elements whose values are not zero; and a normalization unit comparing a number of elements of the vector of the program information with the first statistic, and when the number of the elements of the vector is smaller than the fist statistic and normalizing the vector of the program information by using a length of a normalizing vector which is expressed by the equation $$\sqrt{\sum_{i}^{n}(W_i)^2 + \sum_{i}^{N-n}(AW_j)^2},$$

wherein n is the number of effective elements, $W_i$ is the weight of element i, N is the first statistic and $AW_j$ is the second statistic.

8. The information retrieval apparatus according to claim 7, wherein:

an average of the average number of effective retrieval keys and a maximum number of effective retrieval keys, or a median value of effective retrieval keys of the vector space and the number of retrieval keys of the vector is acquired as the statistic of the vector of the program information.

9. The information retrieval apparatus according to claim 1, wherein:

the information retrieval apparatus is an apparatus by which TV programs or video images can be viewed or recorded and which searches for TV programs or video images;

the program information or the usage information is information of the TV program;

retrieval keys included in the program information or the usage information are data of words, persons' names, time and date that are included in program names, contents of programs; and a manner of usage of the usage information is viewing, recording, playing, fast-forwarding, or deleting of the programs.

10. An information retrieval apparatus by which a user retrieves information, comprising:

a program information storage unit storing program information of a program including a plurality of retrieval keys;

a usage history information storage unit storing usage history information indicating a history of operation content of a program that a user has made; and a computer processing unit connected to a memory comprising:

an information acquisition unit acquiring the usage history information from the usage information storage unit, acquiring the program information of the program which the user operated from the program information storage unit, and acquiring a degree of importance information indicating the degree of importance of a user operation;

a weight calculation unit calculating a weight of a retrieval key included in the program information of the program that the user operated by using the usage history information, the program information and the degree of importance information acquired by the information acquisition units;

a user's preference tendency extraction unit extracting a sum of a weight of the plurality of retrieval keys calculated by the weight calculation unit as information indicating a tendency of a preference of the user;

an information vectorization unit arranging as a vector, on a vector space, the program information acquired by the information acquisition unit;

a number-of-effective-retrieval-keys reduction unit reducing a number of vectors that are effective as retrieval keys from among the vectors of the program information arranged by the information vectorization unit on the vector space;

a statistic acquisition unit acquiring one of an average number of effective elements, a maximum number of effective elements, and a median value of the number of the effective elements in the vector space as a first statistic, and acquiring an average value of weight of the effective elements in the vector space as a second statistic, wherein effective elements are elements whose values are not zero; and a normalization unit comparing a number of elements of the vector of the program information with the first statistic, and when the number of the elements of the vector is smaller than the fist statistic and normalizing the vector of the program information by using a length of a normalizing vector which is expressed by the equation $$\sqrt{\sum_{i}^{n}(W_i)^2 + \sum_{i}^{N-n}(AW_j)^2},$$

wherein n is the number of effective elements, $W_i$ is the weight of element i, N is the first statistic and $AW_j$ is the second statistic, wherein:

the number-of-effective-retrieval-keys reduction unit reduces the number of the effective retrieval keys of the vectors of the program information by:

evaluating the retrieval keys of the vectors of the program information by using the preference of the user obtained by the user's preference tendency extraction unit; and removing the retrieval keys not satisfying an evaluation criterion.

11. An information retrieval method using a computer, comprising:

storing program information of a program including a plurality of retrieval keys;

storing usage history information indicating a history of operation content of the program that a user has made;

acquiring the usage history information from the usage information storage unit, acquiring the program information of the program which the user operated from the program information storage unit, and acquiring a degree of importance information indicating the degree of importance of a user operation;

calculating a weight of a retrieval key included in the program information of the program that the user operated by using the usage history information, the program information and the degree of importance information;

extracting a sum of a weight of the plurality of retrieval keys calculated by the calculating as information indicating a tendency of a preference of the user;

vectorizing by arranging as a vector, on a vector space, the program information;

reducing a number of vectors that are effective as retrieval keys from among the vectors of the program information arranged on the vector space;

acquiring one of an average number of effective elements, a maximum number of the effective elements, and a median value of the effective elements of the vector space as a first statistic, and acquiring an average value of the weight of the effective elements of the vector space as a second statistic, wherein effective elements are elements whose values are not zero; and comparing a number of elements of the vector of the program information with the first statistic, and when the number of the elements of the vector is smaller than the first statistic, normalizing the vector of the program information by using a length of a normalizing vector which is expressed by the equation $$\sqrt{\sum_{i}^{n}(W_i)^2 + \sum_{i}^{N-n}(AW_j)^2},$$

wherein n is the number of effective elements, $W_i$ is the weight of element i, N is the first statistic and $AW_j$ is the second statistic, wherein:

number of the effective retrieval keys of the vectors of the program information is reduced by:

evaluating the retrieval keys of the vectors of the program information by using the preference of the user; and removing the retrieval keys not satisfying an evaluation criterion.

12. A television program information retrieval method using a computer, comprising:

acquiring from an information source program information that comprises retrieval keys and storing the program information on a non-transitory computer-readable memory;

arranging, on a vector space, the retrieval keys;

acquiring one of an average number of effective elements, a maximum number of the effective elements, and a median value of the effective elements of the vector space as a first statistic, and acquiring an average value of the weight of the effective elements of the vector space as a second statistic, wherein effective elements are elements whose values are not zero; and comparing a number of elements of the vector of the program information with the first statistic, and when the number of the elements of the vector is smaller than the first statistic, normalizing the vector of the program information by using length of a normalizing vector which is expressed by the equation $$\sqrt{\sum_{i}^{n}(W_i)^2 + \sum_{i}^{N-n}(AW_j)^2},$$

wherein n is the number of effective elements, $W_i$ is the weight of element i, N is the first statistic and $AW_j$ is the second statistic.

13. The method according to claim 11, comprising:
arranging as a vector, on a vector space whose axis is retrieval key information, the program acquired by the information acquisition unit.

14. The method according to claim 13,
reducing the number of the effective retrieval keys of the vectors of the program information comprises:
evaluating retrieval keys of the vectors of the program information by using the information indicating the tendency of the preference of the user obtained by the user's preference tendency extraction unit; and
removing the retrieval keys not satisfying an evaluation criterion.

15. The method according to claim 13, wherein the arranging comprises:
evaluating the vector of the program information as the retrieval key;
multiplying a weight of the retrieval key of the vector of the program information by a weight of the preference the user corresponding to the retrieval key; and
evaluating whether or not the weight of the retrieval key that was multiplied by the weight satisfies the evaluation criteria.

* * * * *